Figure 1:
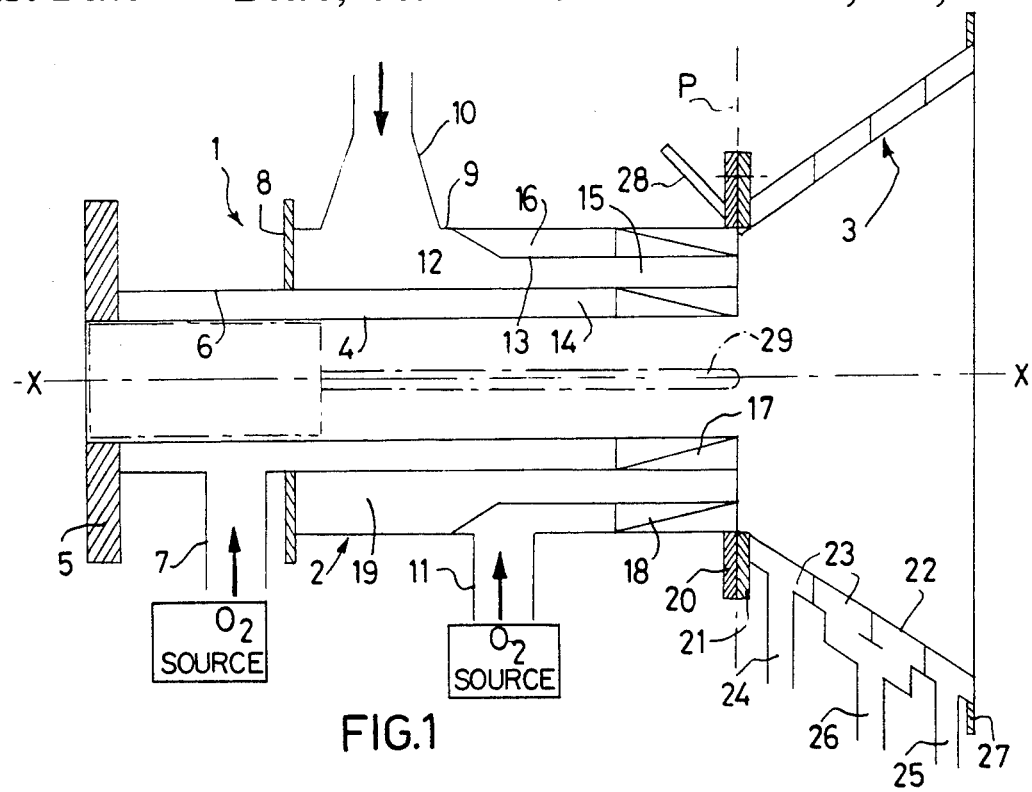

United States Patent [19]

Laurenceau et al.

[11] Patent Number: 4,556,384
[45] Date of Patent: Dec. 3, 1985

[54] BURNER FOR PULVERIZED COAL

[75] Inventors: Serge Laurenceau, Versailles; Luc Moufflet, Vanves; Bernerd Genies, Orsay, all of France

[73] Assignee: L'Air Liquide, Societe Anonyme pour l'Etude et l'Exploitation des Procedes Georges Claude, Paris, France

[21] Appl. No.: 542,344

[22] Filed: Oct. 17, 1983

[30] Foreign Application Priority Data

Oct. 22, 1982 [FR] France .................. 82 17677

[51] Int. Cl.[4] .................................. F23D 11/36
[52] U.S. Cl. ................... 431/160; 431/183; 110/263; 239/132.3; 239/422
[58] Field of Search ............... 431/160, 182, 183, 187, 431/284, 285; 110/261, 263, 264, 265; 239/132.3, 400, 403, 405, 406, 422, 423, 424, 424.5, 433

[56] References Cited

U.S. PATENT DOCUMENTS

| 2,973,727 | 3/1961 | Northcote | 431/284 X |
| 3,049,085 | 8/1962 | Musat et al. | 431/183 X |
| 3,074,361 | 1/1963 | Huge et al. | 431/284 X |
| 3,299,841 | 1/1967 | Hemker et al. | 431/79 X |
| 4,147,116 | 4/1979 | Graybill | 110/263 |
| 4,157,889 | 6/1979 | Bonnel | 431/182 |
| 4,352,675 | 10/1982 | Seipenbusch et al. | 110/264 X |
| 4,455,949 | 6/1984 | Kretschner et al. | 110/263 |

FOREIGN PATENT DOCUMENTS

| 1113263 | 3/1956 | France | 431/183 |
| 917404 | 2/1963 | United Kingdom . | |
| 1099959 | 1/1968 | United Kingdom . | |
| 2093979 | 9/1982 | United Kingdom . | |

Primary Examiner—Margaret A. Focarino
Attorney, Agent, or Firm—Lee C. Robinson, Jr.

[57] ABSTRACT

This burner is so designed as to be capable of operating in a stable manner with no risk of explosion with pure oxygen or air highly enriched with oxygen as the reactant. In one embodiment, a stream of oxygen is delivered through a central tube 4A which terminates in a divergent annular diffuser 30. A mixture of air and pulverized coal is delivered in an intermediate ring 15 around this diffuser and an annular stream of whirling oxygen is delivered in an outer ring 16. Application in indirect heating furnaces, furnaces in which slag exists and cement-making furnaces and in cases where special atmospheres (for example reducing atmospheres) are desired.

9 Claims, 4 Drawing Figures

BURNER FOR PULVERIZED COAL

The present invention relates to burners for pulverized coal.

Industrial burners for pulverized coal employ at the present time air as the reactant. Various air-injecting methods are employed, depending on whether the air is or is not pre-heated and whether the burning occurs in a "cold" furnace or a hot furnace and also in accordance with the type of coal used.

These burners are not fully satisfactory owing to the size of the required volumes of air which result in a large size of the burners, and owing to the presence of a nitrogen ballast which produces, apart from a relatively low flame temperature and a poor thermal efficiency, a poor hooking and a destabilization of the flame which have for consequences:

impossibility of operating with a "cold" furnace without preheated air;

impossibility of starting up a plant in the cold state; the plant is then pre-heated with another fuel, which is sometimes very expensive;

in many cases, the obligation to employ permanently an auxiliary fuel (natural gas or fuel oil in particular), for example by maintaining a pilot flame in the centre of the burner;

necessity to adapt the burner to the type of coal used and to the type of furnace or boiler in a very precise manner;

absence of flexibility in the adjustment of the burner;

impossibility of controlling the combustion process in the flame, which results in an accumulation of unburnt matter or drops in temperature harmful to the process; for the same reason, the shape of the flame cannot be adapted as desired to the considered application.

It has already been attempted to replace the reactant air by air enriched with oxygen or by pure oxygen. However, to the knowledge of the applicant, no industrial burner employing such a reactant has been developed owing to many difficulties encountered. In particular, there is a danger of explosion if the oxygen is mixed too soon with the coal and, moreover, the increase in the oxygen content of the reactant gas increases the velocity of propagation of the flame so that there is a risk that the latter approach the burner and consequently deteriorate the latter.

An object of the invention is to provide a burner for coal which operates in a flexible and reliable manner without a pilot flame with air highly enriched with oxygen or pure oxygen as a reactant and with very diverse types of pulverized coal, even pool in volatile matter, as fuel.

The invention therefore provides a burner for pulverized coal having a self-maintained combustion and comprising a free passageway supplying a mixture of air and coal surrounded concentrically by a first passageway supplying air enriched with oxygen or pure oxygen, and means for supplying air enriched with oxygen or pure oxygen radially inwardly with respect to said first supply passageway, the two passageways opening at the downstream end onto a common transverse plane from which extends a divergent cowl provided with cooling means.

Said supply means may be constructed in various ways:

In a first embodiment, they are formed by an annular passageway surrounded concentrically by the passageway supplying a mixture of air and coal and also opening onto said transverse plane at the downstream end.

In a second embodiment, they are formed by a central passageway which terminates in a divergent annular diffuser and also opens onto said transverse plane at the downstream end.

In a third embodiment, the passageway supplying the mixture of air and coal is a central passageway and said supply means comprise a centripetal injection device for air enriched with oxygen or pure oxygen in the end part of said passageway.

Figure 2:
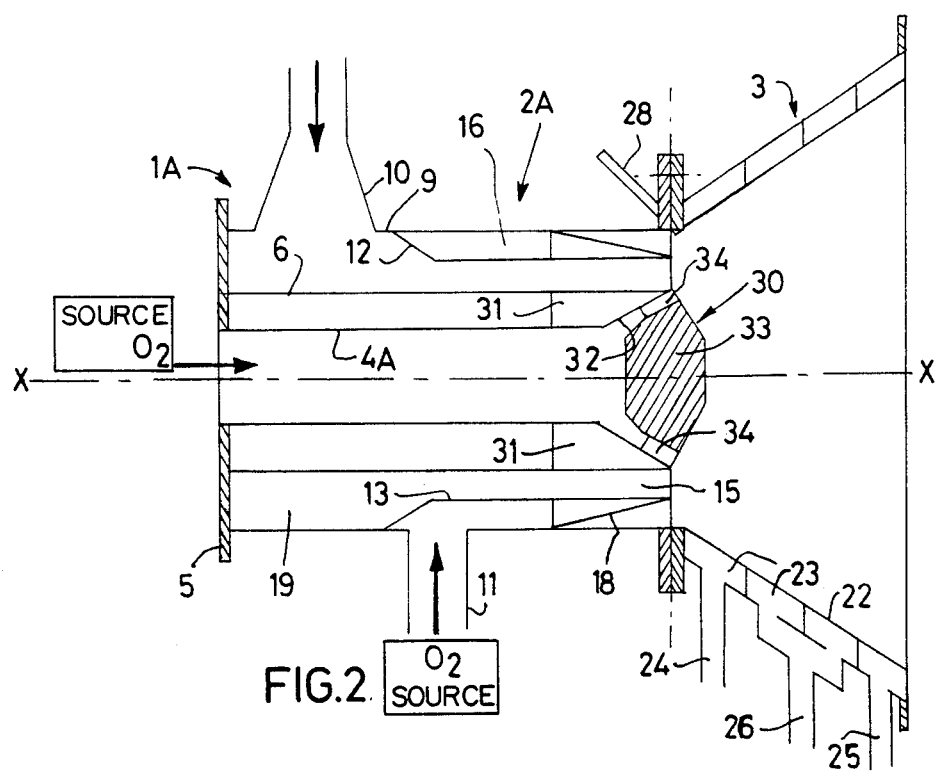
Figure 3:
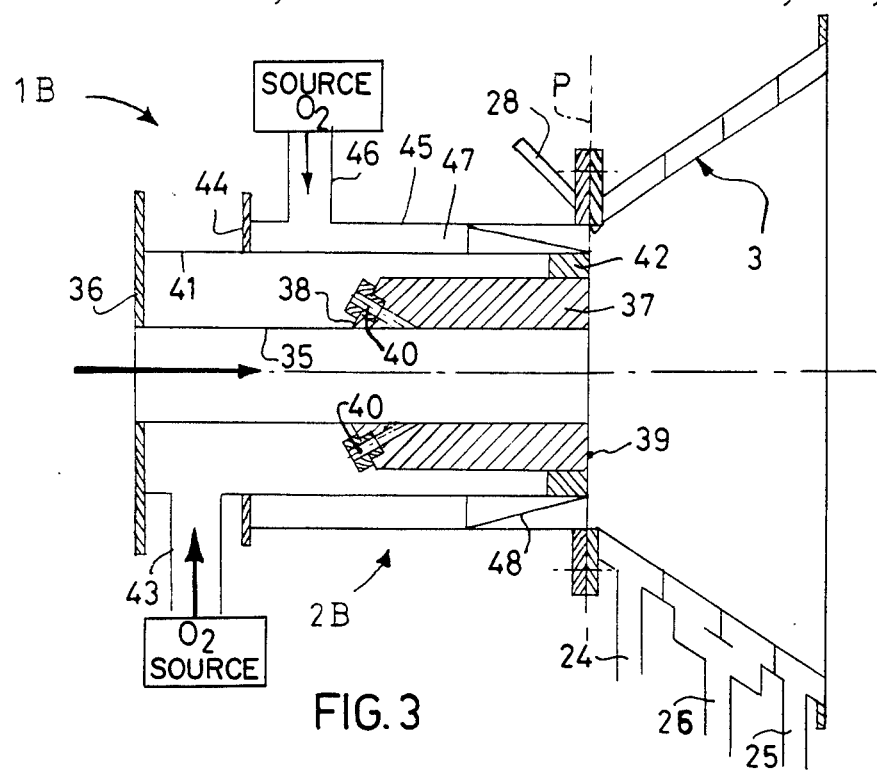
Figure 4:
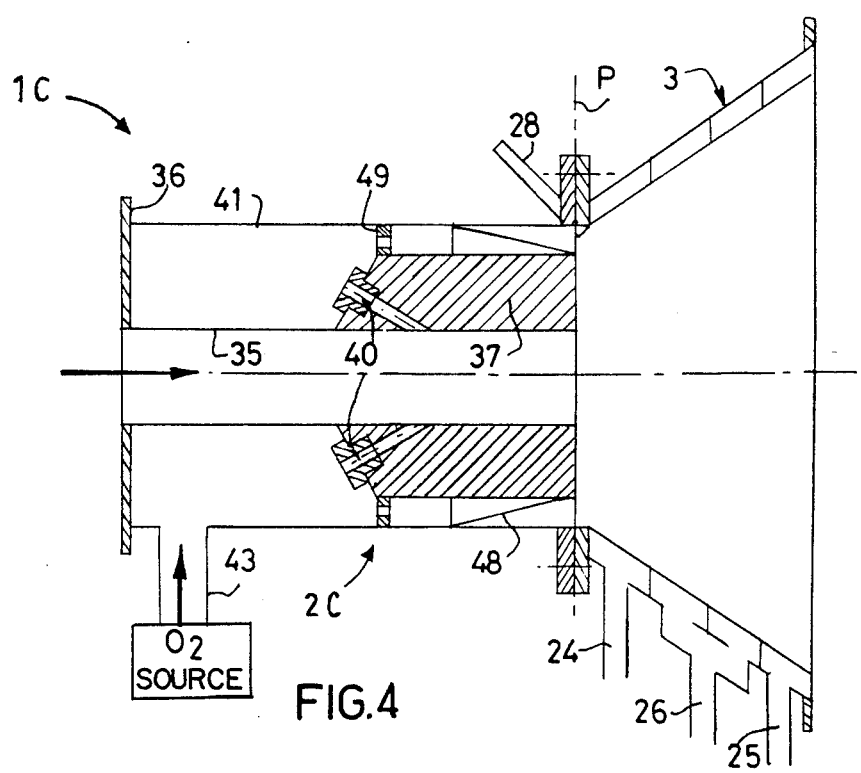

Some embodiments of the invention will now be described with reference to the accompanying drawings, in which:

FIGS. 1 to 3 are diagrammatic longitudinal sectional views of three embodiments of the burner according to the invention, and FIG. 4 is a similar view of a modification of the burner shown in FIG. 3.

The burner 1 shown in FIG. 1 comprises a burner body 2 and a cowl 3.

The body 2 comprises a central tube 4 which extends throughout its length and is open at both ends and carries at its upstream end (on the left as viewed in FIG. 1) an outer flange 5.

A second tube 6 concentrically surrounds the tube 4 throughout its length. It is welded to the flange 5 at its upstream end and opens onto the same transverse plane P as the tube 4 at the downstream end. It has close to its upstream end a pipe 7 connected to a source of oxygen (not shown).

Downstream of the pipe 7, the tube 6 carries an outer flange 8 to which is welded the upstream end of a third tube 9 which extends to the plane P. The tube 9 has close to its upstream end a pipe 10 connected to a device (not shown) which supplies a mixture of air and pulverized coal, and, downstream of the pipe 10, a pipe 11 connected to a source of oxygen (not shown). Between the pipes 10 and 11, a frustoconical deflector 12 which is convergent in the downstream direction is welded by its large base to the interior of the tube 9. This deflector is extended to plane P by a section of tube 3 whose diameter is between those of the tubes 6 and 9.

Thus, in the region of its outlet, the burner body 2 defines three concentric annular gaps which all open onto the plane P: an inner gap 14 supplied with oxygen, an intermediate gap 15 supplied with a mixture of air and pulverized coal, and an outer gap 16 supplied with oxygen. Each of the gaps 14 and 16 is provided with a device having inclined vanes 17 and 18 respectively, for rotating the corresponding oxygen flow about the axis X—X of the burner. Upstream of the deflector 12, the tubes 6 and 9 define an annular large-section chamber 19 which forms a chamber achieving a homogeneous distribution of the mixture of air and coal.

The downstream end of the outer tube 9 carries an outer flange 20 contained in the plane P on which the upstream flange 21 of the cowl 3 is bolted, this cowl having a divergent frustoconical shape. In the illustrated embodiment, the cowl 3 is of the "cold cowl" type, i.e. it is formed by a double wall in which a cooling fluid, for example water, circulates. Thus the double wall 22 is divided into a plurality of compartments 23, some of which are connected to a water inlet 24, 25 while others are connected to water outlet 26. The cowl carries a fixing flange 27 externally on its outlet end.

Tests have been carried out by the applicant under the following conditions:

Outlet velocity of the mixture of air and coal: 10 to 25 m/s, which avoids the clogging of the particles of coal while guaranteeing a good homogeneity of the mixture. The velocity in the supply passageway (not shown) may be slightly higher than 25 m/s. The ratio of air conveyed to coal conveyed varies between 0.5 kg of air/kg of coal and 1.5 kg of air/kg of coal.

The total volume of oxygen injected corresponds to a stoichiometric proportion in the flame relative to the combustion reaction $C+O_2 \rightarrow CO_2$, namely an overall rate of overoxygenation ranging from 68% to 86% depending on the ratio of air conveyed to coal conveyed.

The angles of inclination of the vanes of the devices 17 and 18 with respect to the axis X—X: this angle may vary from 0° to 60°, the two angles being preferably in the same direction. Angles exceeding 0° are preferably chosen owing to the beneficial effect of the rotation of the flows of oxygen on the stability of the flame.

These tests have shown that such a burner can operate in a stable manner without an auxiliary fuel and in particular without a pilot flame, even in a "cold" furnace and when starting up under cold conditions. In other words, the recirculation of the hot gases which occurs in the centre of the burner is sufficient to ensure the continuous ignition of the fuel-reactant mixture. It is merely necessary to employ an igniter which may be for example a small oxy-fuel burner 28 which communicates with the cowl through the flange 20 and is inclined toweard the axis X—X. As soon as the ignition has been achieved, this auxiliary burner may be extinguished since the combustion is self-maintaining.

By way of a modification, the lateral burner may be replaced by a small oxy-fuel burner 29 which is diagrammatically shown in dotdash lines in FIG. 1 and is introduced along the axis X—X into the central tube 4 from the upstream end of the latter and is then withdrawn as soon as the ignition has been achieved so as to protect it from the flame. The outlet end of the tube 4 may then be closed by a suitable closure element (not shown) so as to prevent the accumulation of the recirculated ashes in this region. It may be advantageous to cool this closure element by a circulation of water so as to avoid overheating under the action of the recirculated hot gases.

There will now be given an example of the construction of such a burner:

Furnace: furnace having hollow water-cooled "cold" walls of the following dimensions: length 4.4 m; width: 1.2 m; height: 1.2 m.

Two types of coal were used, the characteristics of which are the following:

|  | Type I | Type II (anthracite) |
|---|---|---|
| % of volatile matter | 30 | 6 |
| L.C.P.° | 31.4 kJ/kg | 32.6 kJ/kg |
| Particle size at 50% | 30μ or 80μ | 30μ |

Quantity of air conveyed/kg of coal conveyed: 1.5 kg.

Flows employed:
oxygen: 314 Nm³/h
air: 232 Nm³/H
coal: 200 kg/h, which corresponds to a heating power of about 1840 kW.

Theoretical overoxygenation rate: 66%; actual overoxygenation rate (taking into account the entries of air into the furnace owing to leakages): 54%.

Velocity of the coal: 16 m/s.

Velocity of the oxygen in the gap 14: 67 m/s with a swirl number 10 of 0.20.

Velocity of the oxygen in the gap 16: 12.5 m/s with swirl number of 0.60.

The swirl number mentioned above is defined by the following formula:

$$S = \tfrac{2}{3}\tan\theta \frac{1 - Z^3}{1 - Z^2}$$

in which $\theta$ = inclination of the vanes of the considered device 17 or 18

$Z = \frac{\text{outside radius of the vanes}}{\text{inside radius of the vanes}}$ There is thus obtained a useful heat efficiency (ratio of the heat recovered in the walls of the furnace to the introduced heat flow) of 60% for a temperature of the smoke of 800° C. The analysis of the smoke permits the calculation of a theoretical efficiency, taking into account the air conveyed, of 86%, with a flame adiabatic temperature of 2759° C. which is to be compared with a theoretical efficiency of 68° with a flame adiabatic temperatue of 2076° C. for a conventional air-coal burner.

It has been found that, by regulating the flows, it was possible to vary the heat power up to three times (from 1110 to 3300 kW) with the same burner, which shows its great flexibility of utilization. Further, it is possible to obtain a stable flame while having an excess or a deficient amount of oxygen relative to the stoichiometric amount, which is of course advantageous in practice.

A very large radiation of the flame is observed, which is the greater as the particle size increases. This increase in the particle size does not destabilize the flame so that it is only limited by the problems of the conveyance of the coal and by the necessity to avoid discharging in the flue of the furnace particles which are still in course of combustion. This possibility of using coal of large particle size is very advantageous from the point of view of the crushing and storage of the coal.

The length of the flame may be estimated to be 1.8 m with a very large heat transfer in the first fifty centimeters. Note that, by modifying the parameters of utilization, it is possible to obtain with the burner different flame shapes and lengths so that the burner may be used in many applications.

Generally, this burner may be used in all cases where a heating power in the form of a burner is necessary and where the presence of ashes is not liable to be disadvantageous for the process. It is particularly appropriate when the presence of a stable flame is necessary for reasons of safety and when it is desired to obtain a high combustion intensity, a high level of temperature (2500° K. for example) and a high intensity of radiation. There may be mentioned in particular indirect heating furnaces such as pot furnaces, furnaces in which a slag exists (arc furnaces, melting ladles) or cement-making furnaces. In many applications, the large amount of heat transferred by the flame of the burner according to the invention permits a reduction in the treating time of the products to be baked and consequently an increase in the productivity of the furnaces or, in the case of tunnel furnaces, a reduction in the dimensions. Further, the aforementioned possibility of a variation from the stoichiometric values permits special atmospheres, for example reducing atmospheres, to be obtained in the enclosure associated with the burner.

The burner 1A shown in FIG. 2 comprises a body 2A at the downstream end of which is fixed the cowl 3. The body 2A differs from the body 2 of FIG. 1 by the fact that the inner tube 4 and the vane device 17 are eliminated and replaced by a central tube 4A which terminates in an annular diffuser 30 at the downstream end and is centred in the tube 6 by radial fins 31. The upstream end of the tube 4A is connected to a source of oxygen (not shown) and the pipe 7 of FIG. 1 is also eliminated.

The diffuser 30 is externally defined by a frustoconical wall 32 whose end of smaller diameter is connected to the tube 4A and whose other end is connected to the downstream end of the tube 6. Internally, this diffuser is defined by an externally frustoconical element 33 the front end of which is crowned. This element is centred in the wall 32 by a small number of radial fins 34.

With the burner 1A, the oxygen introduced through the central tube 4A is directly injected, without a movement of rotation about the axis X—X, into the annular stream of the air-coal mixture issuing from the annular gap 15. This produces an intense recirculation of the hot gases and results in a combustion which is still better than that obtained with the burner of FIG. 1. The crowned shape of the element 33 permis a better control of the recirculation and a limitation of the deposite of particles which are still combustible on the burner.

The burner 1B shown in FIG. 3 also permits the obtainment of a very intense combustion. Its body 2B, to which the same cowl 3 as before is fixed, comprises a central tube 35 connected to the air-coal mixture source at the upstream end. This tube carries at its upstream end an outer flange 36 and is extended in the downstream direction by an oxygen injector 37 which extends to the transverse outlet plane P of the body 2B.

The injector 37 is a thick annular body defined by two cylindrical surfaces connected at the upstream end by a frustoconical surface 38 which diverges in the downstream direction and at the downstream end by a planar surface 39 contained in the plane P. A plurality of nozzles 40 spaced apart on its periphery extend from the surface 38. These nozzles have a double inclination, on one hand, in the centripetal direction in the downstream direction as shown in FIG. 2 and, on the other hand, in the circumferential direction relative to the radial directions which pass through their inlet orifices.

The nozzles 40, two os which have been brought into the plane of the FIG. 3 in order to render the drawing more clear, open onto the inner cylindrical surface of the injector whose diameter is equal to the inside diameter of the tube 35. In order to permit an easy modification of the thrust given to the oxygen by the nozzles 40 for a given supply flow, these nozzles may, as shown, be formed in interchangeable sleeves mounted on the injector body 37 and put into communication with the tube 35 through orifices of larger diameter in the body 37.

The inner tube 35 and the injector 37 are surrounded by an intermediate tube 47 throughout their length. The annular gap thus formed is closed at the upstream end by the flange 36 and at the downstream end by an annular spacer element 42 and it communicates with a source of oxygen (not shown) through a lateral pipe 43. The tube 41 carries, downstream of the pipe 43, an outer flange 44 on which is welded the upstream end of an outer tube 45. The latter extends to the plane P and has a lateral pipe 46 connected to a source of oxygen (not shown). At its downstream end, the annular gap 47 defined between the tubes 41 and 45 is provided with a device having inclined vanes 48 for rotating the flow of oxygen about the axis X—X.

In operation, the air-coal mixture is injected in the form of a full cylindrical stream through the inner tube 35. At a short distance from the plane P there are sent into this stream through the pipe 43 and the nozzles 40 a plurality of jets of oxygen oriented along helices. This produces a powerful stirring of oxygen and coal just before the outlet of the coal in the cowl 3 and results in a very intense combustion with a flame which starts very close to the plane P. The burner 1B is consequently particularly suitable for applications in which a relatively short flame is required.

FIG. 4 shows a burner 1C whose body 2C provided with the cowl 3 differs from the body 2B shown in FIG. 3 only by the fact that a single oxygen supply is provided for the injector 37 and for the outer annular flow. For this purpose, the flange 44 and the outer tube 45 of FIG. 3 are eliminated and the spacer element 42 is replaced by a device having vanes 48 preceded by throttle means 49 constituted for example by a perforated disc. The structure thus obtained is simpler, but in this case it is impossible to adjust as desired the ratio between the two oxygen flows as in the structure of FIG. 3.

The same igniter 28 and the same cowl 3 as in FIG. 1 are shown in FIGS. 2 to 4. By way of a modification, the cowl 3 may be replaced by a "hot" cowl having a solid wall of refractory material. In this case, it is desirable to provide a circulation of water outside the cowl so as to avoid an excessive rise in temperature in the cowl which would deteriorate the burner and even the cowl owing to the resulting increase in the velocity of propagation of the flame.

Throughout the foregoing, the oxygen may be replaced by air highly enriched with oxygen, i.e. containing at least 40% of oxygen. The combustion is then less intense than with pure oxygen but nonetheless affords the aforementioned advantage of flame stability, even in a "cold" furnace and when starting up under cold conditions.

What is claimed is:

1. A burner assembly for pulverized coal having a self-maintained combustion, comprising: a first source of a mixture of air and coal; a second source of substantially pure oxygen; a burner body comprising a free supply passageway for supplying said mixture of air and coal, means connecting said free passageway to said first source, a first supply passageway for supplying substantially pure oxygen concentrically surrounding the free passageway, supply means for supplying substantially pure oxygen radially inwardly with respect to said first supply passageway, means connecting said first supply passageway and said supply means to said second source, said free and first supply passageways having respective downstream discharge ends at which ends they open onto a common transverse plane, said first supply passageway being provided with a device for rotating the gas conveyed by said first supply passageway; and a divergent cowl provided with cooling means and extending from said plane, said cowl having upstream fastening means for removably securing said cowl to said burner body and downstream fastening means for the removable mounting of the burner assembly, said first and second sources supplying said mixture and said oxygen in respective amounts having a coal-to-oxygen ratio which is substantially stoichiometric with respect to the combustion reaction $C+O_2\rightarrow CO_2$.

2. A burner according to claim 1, wherein said supply means comprise a second supply passageway which is concentrically surrounded by said free supply passageway and has a downstream end at which end the second supply passageway also opens onto said transverse plane.

3. A burner according to claim 2, wherein said second supply passageway is an annular passageway provided with a device for rotating the gas conveyed by said second supply passageway.

4. A burner according to claim 1, wherein said free supply passageway is a central passageway having an outlet end, said supply means comprising a centripetal injection device for substantially pure oxygen in a part of the central passageway adjacent to said outlet end of the central passageway.

5. A burner according to claim 4, wherein the injection device comprises a plurality of injection nozzles inclined in a circumferential direction relative to a radial direction.

6. A burner according to claim 5, wherein said nozzles are also inclined in a longitudinal direction toward the outlet end of the central passageway.

7. A burner according to claim 4, wherein the injection device is disposed at the outlet end of the first supply passageway and is supplied with substantially pure oxygen by the first supply passageway, the first supply passageway being provided with throttling means.

8. A burner for pulverized coal having a self-maintained combustion, comprising a free supply passageway for supplying a mixture of air and coal, a first supply passageway for supplying oxygen-enriched air or pure oxygen concentrically surrounding the free passageway, a second supply passageway concentrically surrounded by said free supply passageway for supplying oxygen-enriched air or pure oxygen radially inwardly with respect to said first supply passageway, said free, first and second supply passageways having downstream ends at which ends they open onto a common transverse plane, and wherein said second supply passageway is a central passageway having a divergent annular diffuser that terminates the central passageway, said diffuser being in the form of a frustoconical element whose downstream end is crowned, and a divergent cowl provided with cooling means and extending from said common transverse plane.

9. A burner for pulverized coal having a self-maintained combustion, comprising a central passageway for supplying a mixture of air and coal, said central passageway having an outlet end, a first oxygen supply passageway for supplying substantially pure oxygen concentrically surrounding the central passageway, a centripetal injection device for supplying substantially pure oxygen to a part of the central passageway adjacent to said outlet end thereof, a second oxygen supply passageway having an inlet for receiving substantially pure oxygen, and having a closed end, the injection device being disposed in the vicinity of the closed end of the second oxygen supply passageway and the second oxygen supply passageway being surrounded by the first oxygen supply passageway, said central and first oxygen supply passageways having downstream ends at which ends they open onto a common transverse plane, and a divergent cowl provided with cooling means and extending from said plane.

* * * * *